Aug. 16, 1938.    S. J. KELLEY    2,127,221
STARTING DEVICE FOR RACE TRACKS
Original Filed Feb. 24, 1932    5 Sheets-Sheet 3
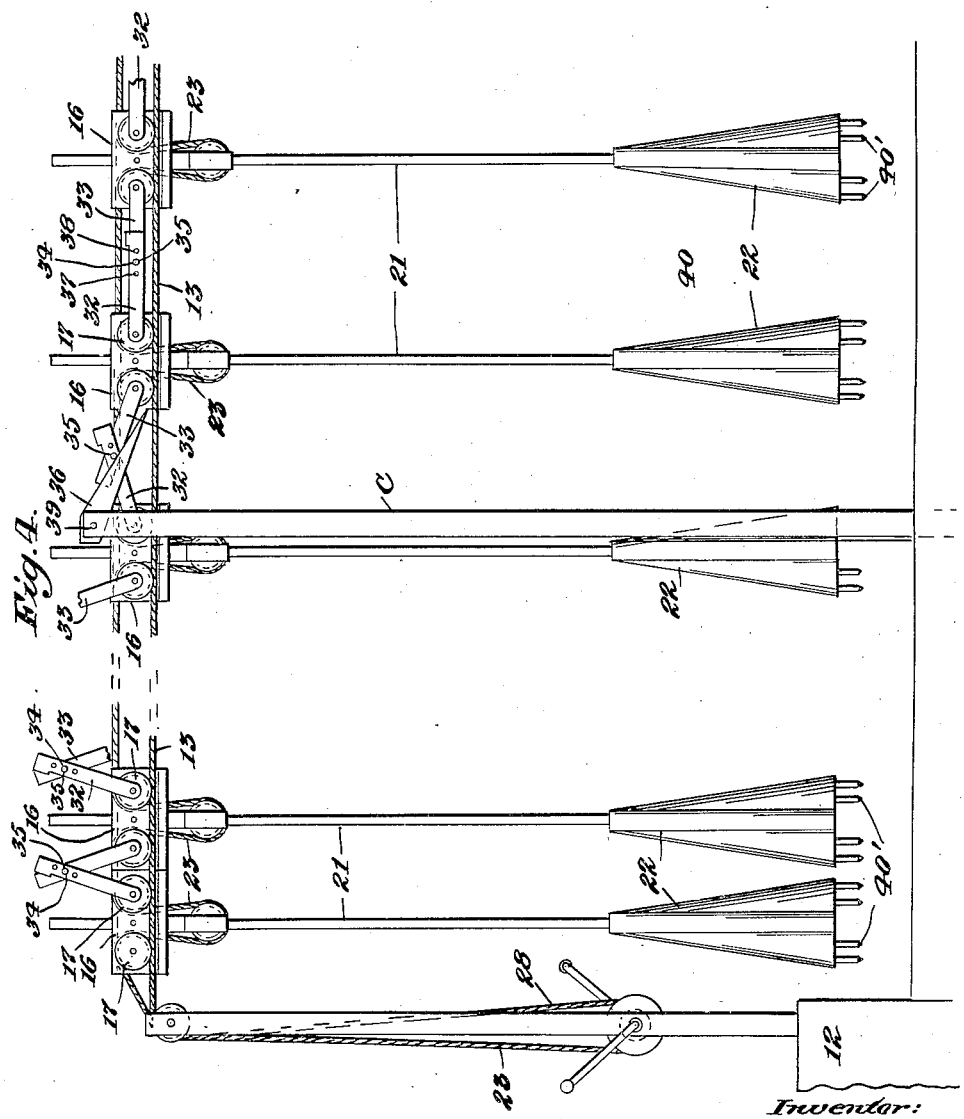
Inventor:
S. J. Kelley,

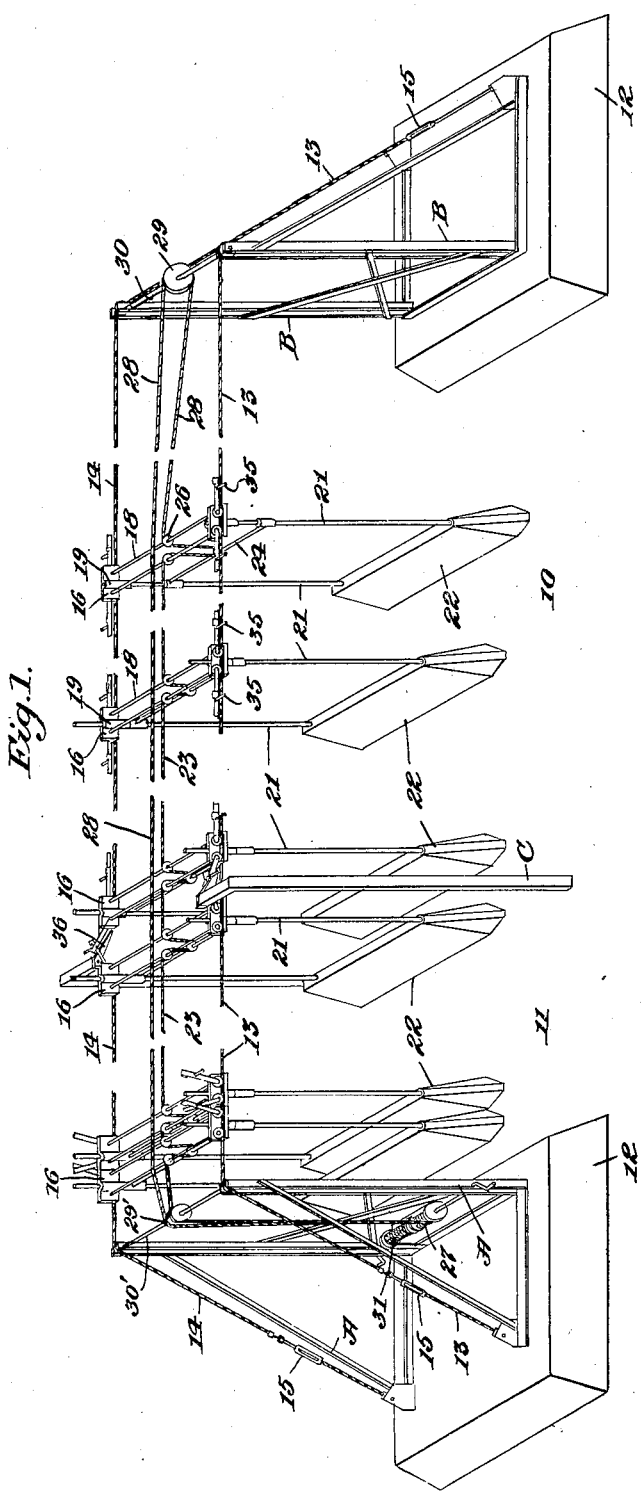

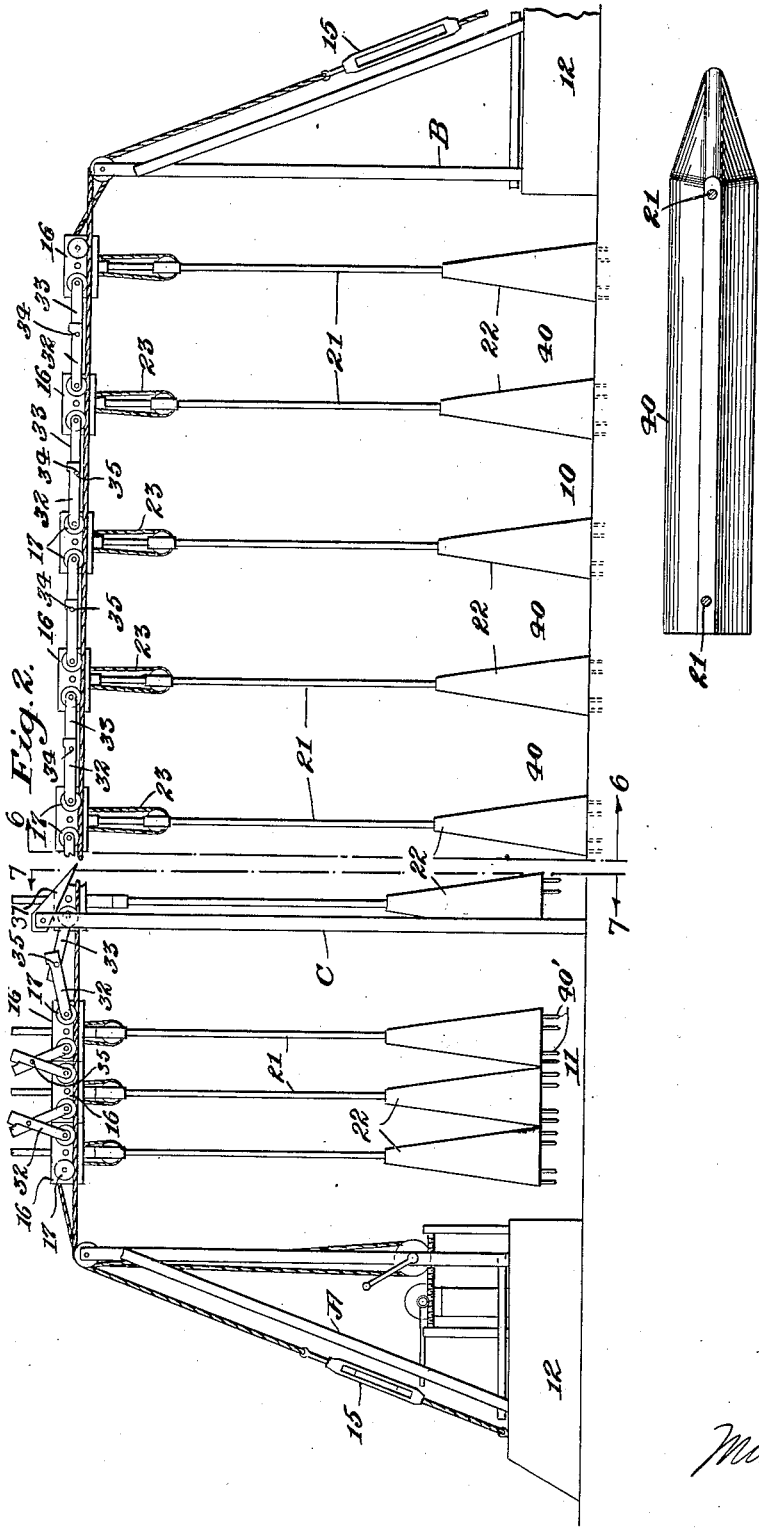

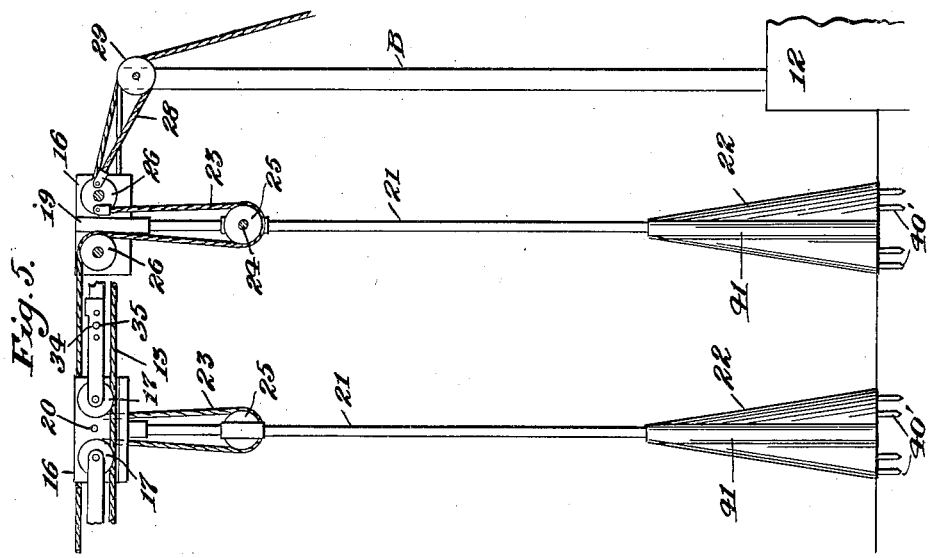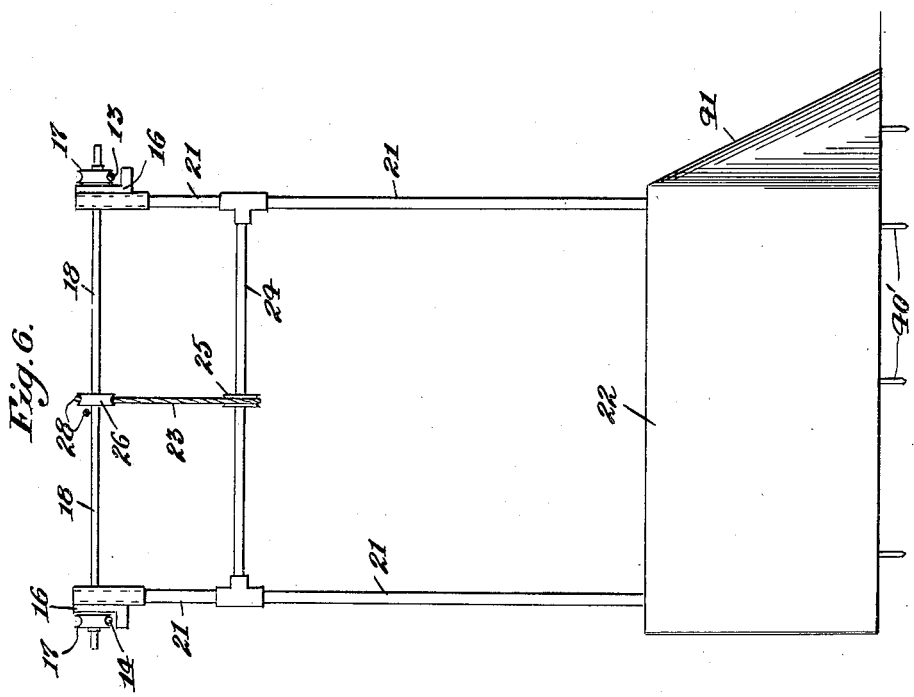

Aug. 16, 1938.   S. J. KELLEY   2,127,221
STARTING DEVICE FOR RACE TRACKS
Original Filed Feb. 24, 1932   5 Sheets-Sheet 5
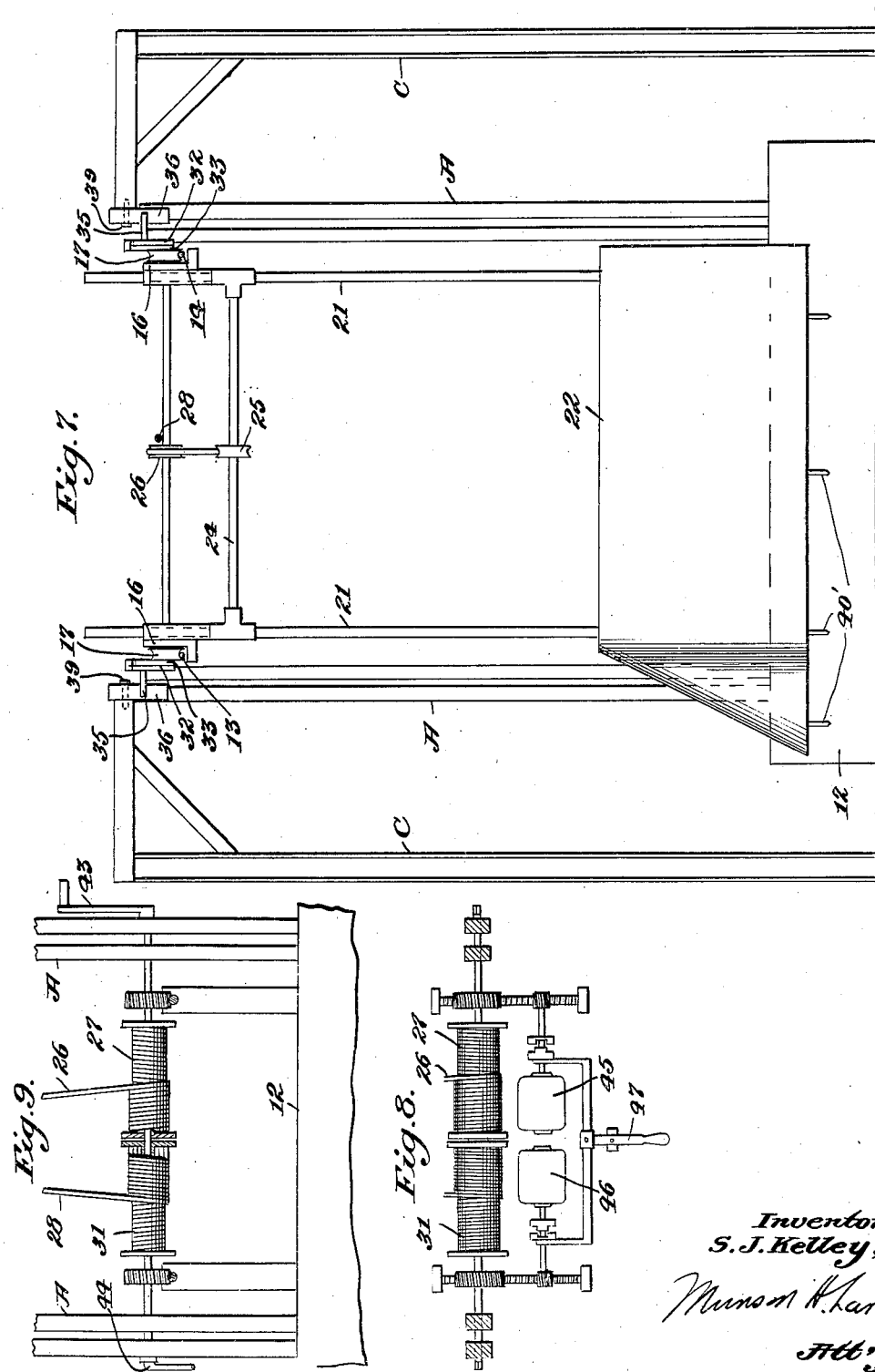
Inventor:
S. J. Kelley,
Munson H. Carl.
Att'y.

UNITED STATES PATENT OFFICE 2,127,221

STARTING DEVICE FOR RACE TRACKS

Shawl J. Kelley, Baltimore, Md., assignor to Pylodyne Corporation, Chicago, Ill., a corporation of Illinois Application February 24, 1932, Serial No. 594,955
Renewed June 8, 1937

27 Claims. (Cl. 119—15.5)

My invention relates to portable starting stalls for horse race tracks. In this class of starting stalls the stall defining structure is temporarily placed across the track at the starting point and then removed before the horses come around to pass the starting point again.

Briefly described, my starting stalls as here shown are formed by separate and readily removable pylons which may be self-supporting arranged at spaced intervals across the track at the starting line in lieu of the usual built-in stall partitions or the usual gang stalls, that is, stall partitions carried by a portable superframe. The sides slope upwardly and inwardly from a broad supporting bottom. Thereby the horse's foot room between adjacent pylons is narrow enough to keep the horse straight and centered between the pylons, but at the same time there is ample clearance toward the top for the horse's body and the jockey's legs. On its bottom the pylon carries anchoring spikes.

Another aspect of my invention is concerned with mechanism for automatically placing my stall-defining partition or pylons on the track and for removing them from the track.

The objects and advantages of my invention, as to the stall partitions themselves, may be classified as follows:

*As to the jockey:* His legs are protected against contacting the stall partition as well as against contacting the adjacent horse or jockey; he has a relatively free and unobstructed view in all directions; the assistant starter is required by the narrow foot space of the stalls to stand forwardly thereof where the jockey can easily observe all his actions; and the horse is easily guided into the stall.

*As to the assistant starter:* The pylons which constitute the partitions between stalls serve as safety islands for the assistant starter, who stands on the track, and because of the width of the pylon at its forward end the assistant starter is protected from the horse he is holding as well as from the adjacent horse; the front end of the pylon affords a substantial abutment for the assistant starter, which he can use to keep himself from being pulled back into the stall by a retreating horse, so that the assistant starter is not maneuvered into the stall between the partition and the horse, where he may be injured; he is kept in front of the horse and in plain view of all the spectators so that his actions are entirely above suspicion; and the horses, when running out from the stalls, are headed straight and evenly spaced apart, so that the assistant starters are in less danger of being crushed between emerging horses.

*As to the horse:* "Burning" of the sides of the horse by scraping against a partition is prevented by the sloping side of the pylon, which insures an ample clearance for the lateral overhang of the body beyond the hoofs; there is no structure over which the horse must pass in entering or leaving the stall, and hence no danger of his stumbling thereon or shying on account thereof; the overhead cables and partition handling apparatus are quite open and cast but little shadow; the kicking of the partition by a neighboring horse will not frighten one horse because no noisy bridge-like structure is vibrated; if the horse steps or kicks onto the side of the pylon, its steep slope directs his hoof down to the ground, avoiding injury or stumbling; the sides of the pylon always extend all of the way down to the track regardless of the crown or bank contour of the track, and hence there are never gaps between the sides and the surface of the track between which the horse's hoof may become wedged and the foot thereby injured; the form of the stalls gives the assistant starter no occasion to be between the horse and one of the partitions, which is likely to give the horse a poor start and direct him toward an adjacent horse, and which has often prompted assistant starters to kick the legs of an unruly horse to get it into proper position; the ground space available to the horses' feet between the partitions is ample for the characteristic spreading of the horses' feet in getting an effective start, but still sufficiently narrow to prevent the horses' getting out of substantial parallelism with the partitions; and the horses are more or less uniformly spaced apart, as they start from the stalls.

*As to the racing plant:* The starting stalls are extremely flexible as to arrangement; they can, if necessary, be narrow or wider to lend themselves to a larger or smaller number of horses; the pylons are not injurious to the track itself; they do not result in some portions of the track being wetter than others because, being placed on the track for only short intervals, their shadows cannot substantially retard drying of the track; no adjustments have to be made to fit the partitions to the contour of the crown or bank of the track as in the instance of partitions fixedly suspended from overhead supporting frames; they are very quickly and readily set or removed, whereby the track may be cleared very promptly after the start; they require no runways to or from the track nor ramps in the instances of filled tracks, and they require no large gates for their removal from the track; there is no injury to tracks in removing the stalls, as, for instance, by the load on the wheels of frame supported gang partitions sinking into a wet track; and my stalls cause comparatively little interference with the full visibility of the jockeys and the assistant starters when in use.

As to the stall itself: The pylons are light but durable and sturdy; while readily removable, they are securely anchored to the track against tipping and sliding, and of substantial and broad base to give them a firm footing; their centers of gravity are low, which further prevent their tipping; and their cost of manufacture is but a small fraction of that of gang stalls.

As to the automatic partition placing and removing mechanism phase of my invention, it embraces the following objects and features:

I employ an overhead mechanism for suspendingly placing and removing the stall-defining partitions. In gang stall starting devices previously used, the overhead support has been in the form of a heavy framework which casts a marked shadow upon the race track. Such a shadow has the effect of frightening the horses, causing them to jump and rear, thus interfering with the race.

Another disadvantage possessed by overhead gates of the type now in use is the complicated mechanism employed, which frequently gets out of order with the result that the gates or partitions cannot be moved from the track in time to leave the same free for the passage of the racing horses after they have passed around the track. Still another disadvantage of starting devices or gates as now in use is the expense of construction, which frequently amounts to several thousands of dollars.

Accordingly one of the objects of the present invention is to provide an overhead support which does not cast any noticeable shadow, and which will be at the same time strong, serviceable and inexpensive to construct, and which will not get out of order. This is accomplished according to the present invention by utilizing a pair of thin but strong cables extending across the track as the sole support for the partitions.

A further object of the invention is to provide means for positively spacing the partitions apart when the same are resting upon the track, which spacing means may be retracted when it is desired to move the partitions along the supporting cables in order to clear the track for the race after the start thereof.

A further object of the invention is to provide adjustment for the spacing devices in order that the stalls may be made to accommodate horses of different sizes.

Other objects of the invention will be apparent from a consideration of the accompanying drawings and the following description, in which are set forth a preferred embodiment of the invention, for the purpose of illustration, the invention, however, not being limited to the precise details therein disclosed.

In the drawings:

Fig. 1 is a perspective view, largely diagrammatic in character, illustrative of the general arrangement and operation of my improved starting device, details of construction being shown in the other figures;

Fig. 2 is a view taken across the track, and illustrating the starting device, this figure indicating a motor for selective operation of the partitions, in place of manual means, such motor being omitted from Fig. 1;

Fig. 3 is a top plan view of one of the gates or partitions;

Fig. 4 is a fragmentary view on an enlarged scale across the track, showing one end of the starting device, and showing in enlarged detail the means for automatically raising the spacing means separating the partitions as the partitions are being drawn toward one side of the track after the race has commenced;

Fig. 5 is a fragmentary detail view across the track, showing several partitions at the opposite side from that illustrated in Fig. 4, and showing the manner in which the cables employed for moving the partitions across the track are attached to the end carriage from which is suspended the last partition;

Fig. 6 is a detail view across the sections showing one of the partitions and the means for supporting the same, the view being taken approximately on line 6—6 of Fig. 2;

Fig. 7 is a view partly in section and partly in elevation across the track, the view being taken approximately on line 7—7 of Fig. 2;

Figs. 8 and 9 are detail views showing a form of operating mechanism, which may be employed both for moving the partitions across the track and for raising and lowering the same, in which mechanism motors or manual means may be selectively utilized.

Referring particularly to Figs. 1 and 2, reference numeral 10 denotes a cross section of a race track at the starting portion thereof, over which track the starting device which constitutes the present invention is to be suspended. At the left of the track, as indicated by the reference numeral 11, is a space intended for storing the partitions which provide the stalls of the starting device. It is intended that the partitions shall be spaced at suitable intervals across the track portion 10 at the start of the race to provide stalls for the horses, and as soon as the race has commenced, the partitions are raised and moved to the left, as indicated in Fig. 1, into the space 11, where the partitions are stored in contact with each other. The space 11 constitutes only a small fraction of the width of the race track 10. It is desirable that the track 10 be cleared of all obstruction, both from above and from the sides, and accordingly it is important that the supports for the partitions occupy as little space as possible, thus obstructing a minimum amount of light.

At 12 are indicated platforms upon which pairs of standards A, A and B, B are mounted. Intermediate the standards A and B is a pair of posts or standards C, C, which separate the track portion 10 from the storage space 11 at the left thereof.

Supported between the pairs of standards A and B are a pair of spaced cables 13 and 14, suitably anchored to the standards and extending across the track. These cables form the only overhead support for the partitions of the starting device, and are so small as to be practically invisible. The cables, however, are of great strength and will readily support the weight of the partitions. The cables may be tightened by any suitable means, as for example, turn-buckles 15 located at the ends of the cables. It will be noted that the standards A, B and C may be located entirely off the track, and form no obstruction to the racing horses. Moreover, the standard B may be so located as to form no obstruction to the view of the observers. It will also be noted that the standards are formed of conventional structural material, and may be erected at a negligible cost. The parts are standard and may be removed or replaced at any time. Moreover, owing to the skeleton-like framework, very little obstruction of view would be offered, even though one or more of the standards were in front of the observers of the race. The cables which constitute the supports for the stall partitions offer no obstruction whatever to the view of the observers and cast no shadow.

According to the preferred embodiment of my invention, carriages 16 are provided for supporting the stall partitions, these carriages being shown in detail in Figs. 4 and 5. The carriages are preferably mounted on rollers 17, 17, which run on the supporting cables. Rods 18, 18 connect opposite carriages and form a mounting for the rollers 17, 17.

The carriages are preferably provided with cylindrical portions, guides or sockets 19, which may be pivoted as indicated at 20 in Fig. 5, or may be formed integral with the carriages, as shown in Fig. 1. These guides or sockets are adapted to receive the stems 21 of the stall partitions 22. The pivotal mounting of the guides is for the purpose of allowing adjustment of the partitions to compensate for variations in the level of the track and to insure the vertical hanging of the partitions.

The partitions are supported by means of a flexible cable or rope 23. As shown, the stems or rods 21 of the partitions 22 are connected by cross bars 24, each of which carries a pulley 25 centrally mounted thereon, as indicated in Fig. 6. Likewise the rods 18, 18 connecting the carriages 16, 16 carry pulleys 26, 26 (see Figs. 2 and 5). The cable 23 passes from the left over the left pulley 26 of each set, then under the lower pulley 25 supporting the partition 22, thence over the right pulley 26 and then to the supports for the other partitions. As shown in Fig. 5, the cable 23 is anchored at one end to the last pulley 26 at the right. The other end of the cable 23 is wound about a drum 27, as best shown in Figs. 1, 8 and 9.

Another cable or rope 28 is also anchored to the end pulley 26 (see Fig. 5), and passes about a pulley 29 carried by a cross bar 30 connecting standards B, B, thence back above the rods 18 as indicated in Fig. 1, thence over a second pulley 29' carried by a cross bar 30' connecting standards A, A, from which the cable passes around a second drum 31, herein shown as mounted coaxially with the drum 27, but operated independently thereof (see Figs. 8 and 9).

In order to maintain proper intervals between the successive partitions 22, 22 etc., positive spacing means are provided, which are most clearly indicated in Figs. 1, 2, 4 and 5. These spacing devices comprise a pair of arms or rods 32, 33 pivoted together at 34. One rod of each pair is provided with a pin 35 which extends outwardly at right angles to the arm to which it is attached and is adapted to engage tripping means 36 (Figs. 1, 2 and 4) carried by standards C, C as the partitions are moved along the supporting cables 13, 13, and thus raise the spacing devices, which collapse by reason of their pivoted connection and allow the partitions to come in contact one with another within the storage space 11, as indicated in Fig. 1.

It is desirable to provide for adjustment of the spacers, and for this purpose any number of additional holes 37, 38 may be provided to allow adjustment of the intervals between the partitions to suit the requirements of the particular case and to accommodate horses of different sizes.

As shown in Figs. 1, 2 and 4, the tripping means 36 comprise wedge or cam-shaped members pivoted at 39 at the upper portions of the supports C, C. The movement of these cams is limited in a downward direction, but free upward swinging movement is permitted.

The partitions 22 are specially formed to provide stalls 40 that are narrower at the ground portion than above. It will be noted that the partitions are thicker at their lower portions, and converge upwardly. The entrance end of each of the partions is preferably reduced as indicated at 41 to permit animals to enter the stalls more readily (Figs. 3 and 6).

I have found in practice that horses will enter a space which is wide enough for their bodies to pass through, but will not consider the width at the foot portion. Thus by providing greater width at the upper portion of the stall, the horses readily enter the same. The constricted width at the base of the stalls prevents a horse from turning about within the stall and either injuring himself or interfering with the start of the race. Suitable ground engaging means may be provided to insure contact with the floor of the track. As shown, pins 40' are provided for this purpose, but other means may be provided if desired. The pylon-like stalls 22 are so spaced that the distance between a pair of partitions at their upper ends is, of course, in accordance with the usual spacing between stalls in the usual gang type. The height of the partitions is a little more than this spacing distance.

For actuating the partitions to move them up or down or across the supporting cables, any suitable power means may be employed, either manual or motor. In Fig. 1 manual means only are disclosed. In Figs. 2 and 8 power means are also indicated. Thus the drums 27 and 31 may be actuated either by hand cranks 43 and 44 or by means of motors 45, 46, either of which motors may be thrown into operation by the actuation of a hand lever 47, or, if desired, an automatic clutch may be employed which is actuated whenever the motors have obtained sufficient speed.

*Operation*

The operation of the device will be apparent from the foregoing description. Assuming that the partitions 22 are closely spaced and supported in raised position over the space 11 at the left, and it is desired to move them to the right to form stalls for the start of the race, it is only necessary to pull on the cable 28 by operating the drum 31 through the handle 44, at the same time allowing the cable 23 to unwind from the drum 27. In this manner the partitions are drawn to the right, as indicated in Fig. 1. The drum 27 is frictionally mounted in order to resist rotation as the cable 28 is pulled. The drum 31 is likewise frictionally mounted. When sufficient tension is exerted on the cables 23 and 28, the successive partitions separate out from each other, causing the spacing arms 32, 33 to assume the horizontal position, as indicated in Fig. 2, thus insuring a proper interval between the partitions 22. When all the partitions are over the track 10, they are lowered by slackening the cable 23 by turning the drum 27 in the proper direction. As the partitions are lowered the pins engage the ground and insure firm support. The pivoted mounting of the guides 19 insures the vertical positioning of the partitions. The partitions now provide a suitable number of spaced stalls 40 and the apparatus is now in position for the start of the race. The horses enter the stalls and may be retained in place by means of suitable chains (not shown). At the proper moment, the horses are released from the stalls in any suitable and well known manner. It is now important to remove the partitions at once, as it requires only a short time for the horses to return to the starting point after passing around the track. Any difficulty with complicated mechanism might prove disastrous, but the mounting of the present device is so simple that it is impossible for any of the parts to get out of order. To remove the partitions the drum 27 is turned in a direction to apply tension to the cable 23. The first result is to raise the partitions from the ground, after which continued operation of the drum 27 in the same direction moves the partitions to the left, toward and into the storage space 11. This operation is permitted due to the frictional mounting of the drums 27 and 31. As the partitions pass into the storage space the pins 35 carried by the spacer arms successively ride over the upper surface of the cam or tripper arm 36, thus causing the spacing arms to assume the raised position and allowing the partitions to contact with each other so as to occupy a minimum of space.

The broad base of each pylon 22 renders it self-supporting on the track, although its stems 21, being guided in the sockets 19, serve auxiliarly more positively to prevent lateral tipping of the stall. The guides and stem are primarily incidents to the automatic removing and placing mechanism, although they incidentally thus serve as auxiliary braces. The stems also serve incidentally as visual guide posts, easily seen by the horses to aid the horses in properly entering the stalls. The low heights of the pylons themselves might preclude their being easily seen by the horses in entering the stalls.

What I claim is:

1. In a starting device for a rack track, upright supports positioned at each side of the race track, a pair of spaced cables extending across the track between the supports, rigid stall partitions, means for slidably suspending said partitions from said cables, said cables and suspending means constituting the sole overhead support for said partitions, and rigid means for spacing said partitions apart at fixed intervals without interfering with the sliding operation.

2. In a starting device for a race track, upright supports positioned at each side of the rack track, a pair of spaced cables extending between the supports, rigid stall partitions, means for slidably suspending said partitions from said cables, said cables and suspending means constituting the sole overhead support for said partitions, and rigid means for spacing said partitions apart at fixed intervals without interfering with the sliding operation, said spacing means being adjustable.

3. In a starting device for a race track, upright supports positioned at each side of the race track, a pair of spaced cables extending between the supports, stall partitions suspended from said cables, said cables and supports constituting the sole overhead support for said partitions, means for spacing said partitions apart at fixed intervals, means for moving said partitions horizontally along the cables, and means for automatically tripping said spacing means as the partitions are moved along said cables.

4. In a starting device for a race track, a pair of spaced cables extending laterally across the track, stall partitions suspended from said cables, means for moving said partitions along the cables, means for spacing said partitions apart, and means for tripping said spacing means.

5. In a starting device for a race track, a pair of spaced cables extending laterally across the track, stall partitions suspended from said cables, means for moving said partitions along the cables and for raising and lowering the partitions, means for spacing said partitions apart, and means for tripping said spacing means.

6. In a starting device for a race track, fixed upright supports positioned at each side of the race track, a pair of spaced cables supported by the supports and extending across the track between the supports, rigid stall partitions, means for slidably suspending said partitions from the cables, said cables and suspending means constituting the sole overhead support for said partitions and the sole overhead structure, and means for raising and lowering said partitions.

7. In a starting device for a race track, a plurality of parallel partitions each having a substantial base of sufficient width to support the partition upright, and diminishing in width gradually upwardly from said base, and means for supporting the partitions from above and means for spacing the partitions apart to form stalls.

8. In a starting device for a race track, a plurality of parallel partitions each having a substantial base of sufficient width to support the partition upright, and diminishing in width gradually upwardly from said base, and means for spacing the partitions apart to form stalls, and means for raising and lowering the partitions one at a time.

9. In a starting device for a race track, a plurality of partitions, means for suspending the partitions from above, means separate from the suspending means for spacing the partitions apart, said means including spacing bars and means for tripping the spacing bars.

10. A device as set forth in claim 9, wherein the spacing bars are adjustable.

11. A device as set forth in claim 9, wherein the spacing bars separating each pair of partitions are hinged.

12. In a starting device for a race track, a pair of fixed upright supports positioned one at each side of the race track, a pair of spaced cables extending across the track between the supports, rigid stall partitions suspended from the cables, and cable means for raising and lowering the partitions.

13. In a starting device for a race track, a pair of fixed upright supports positioned one at each side of the track, a pair of spaced cables extending horizontally between the supports and across the track, rigid stall partitions suspended from said cables, and means for moving the partitions horizontally along said cables and for raising and lowering said partitions.

14. In a starting device for a race track, a pair of overhead supports extending horizontally across the track, spaced partitions tapering upwardly on each side from their bases and suspended from said supports, and means for raising and lowering the partitions one at a time, said partitions when lowered into contact with the track forming a plurality of stalls which are narrower at the ground than at the upper portion of the partitions.

15. In a starting device for a race track, a pair of overhead supports extending across the track, spaced partitions suspended from said supports and tapering upwardly on each side from their bases, means for raising and lowering the partitions, said partitions when lowered into contact with the track forming a plurality of stalls which are narrower at the ground than at the upper portion of the partitions, and adjustable spacing bars separating the partitions to accommodate horses of different sizes.

16. In a starting device for a race track, a pair of overhead supports extending horizontally across the track, spaced partitions tapering upwardly on each side from their bases and adapted to be suspended from said horizontal supports, means for raising and lowering the partitions one at a time and for moving said partitions horizontally along the supports, said partitions when lowered into contact with the track forming a plurality of stalls which are narrower at the ground than at the upper portion of the partitions.

17. In a starting device for a race track, a pair of overhead supports extending horizontally across the track, partitions tapering upwardly on each side from their bases and suspended from said supports, spacing means for said partitions, means for raising and lowering the partitions and for moving the partitions horizontally along the supports, said partitions when lowered into contact with the track forming a plurality of stalls, which are narrower at the ground than at the upper portion of said partitions, and means for automatically tripping said spacing means as the partitions are moved along the supports.

18. In a starting device for a race track, a pair of spaced supports extending horizontally across the track, stall partitions adapted to be suspended from said supports, and common means serving both for moving the partitions across the track on said supports and for raising and lowering the partitions one at a time from and toward the ground.

19. In a starting device for race tracks, a plurality of parallel partitions adapted to be suspended from above and raised and lowered individually from and toward the ground, each partition tapering gradually upwardly on each side from the base thereof, said base being flat and of sufficient thickness to support the partition in upright position on the ground without other supporting means, and having a pair of upwardly extending spaced arms, one at each end of the partition, provided with means for attachment to overhead supports.

20. In a starting device for a race track, a pair of spaced cables extending horizontally across the trackway, fixed supports for said cables, one on each side of the trackway, rigid stall partitions suspended from said cables and hinged spacing bars between said partitions, and means for raising and lowering said partitions one at a time.

21. In a starting device for a race track, a pair of spaced cables extending horizontally across the trackway, supports for said cables, rigid stall partitions suspended from said cables, means for moving the partitions along the cables, hinged spacing bars between said partitions, and means for tripping said spacing bars as the partitions are moved along the cables.

22. In a starting device for a race track, a pair of spaced parallel supports extending horizontally across the track, a plurality of partitions adapted to be suspended in parallel from the supports, and common means for raising and lowering the partitions and for moving them horizontally along the supports.

23. A race track starting device partition between adjacent stalls having a base of sufficient width to support the partition upright, and being of gradually diminishing width from the bottom to the top.

24. As one of a plurality of similar devices which placed side by side in spaced relation across a race track form starting stalls for the horses, a pylon of elongated plan section having lateral sides inclined upwardly and inwardly from a wide bottom, the pylon being adapted to be quick-removably supported by the track and from its bottom and wholly within the perimeter thereof.

25. A set of starting stalls for a horse race track comprising a plurality of pylons arranged in side by side parallel spaced relation across the track, each pylon having a supporting bottom resting upon the track and side walls inclined upwardly and inwardly from the respective lateral edges of the bottom, the pylons being removable by lifting from the track.

26. In combination with a race track, a set of three or more removable pylons placed upon the track in parallel side-by-side spaced-apart arrangement across the track to form starting stalls between adjacent pylons, the pylons being supported by quickly removable engagement of their bottoms with the track, each pylon being wide at the bottom and narrow opposite the upper part of the horses' legs, the bottoms being spaced apart to expose unobstructed areas of the track, each wide enough for a horse to stand on and unobstructedly communicating with the track forwardly and rearwardly of the pylons.

27. As one of a set of similar unit devices set in spaced parallel arrangement across a race track to form starting stalls therebetween for horses, a self-supporting pylon comprising a broad track engaging bottom having lateral edges, lateral side walls extending upwardly and inwardly from the lateral edges of the bottom to a height considerably above the horse's feet, but considerably less than horse's height, and a longitudinally disposed vertical frame extending, from adjacent the front of the pylon, upwardly from the top connecting the side walls beyond a height in the order of stirrup height, the pylon constituting a broad base for supporting the frame.

SHAWL J. KELLEY.